July 12, 1938.    J. W. SMITH    2,123,385
MOUNTING FOR OPHTHALMIC LENSES
Filed Nov. 16, 1933

INVENTOR.
Joseph W. Smith.
BY
ATTORNEYS.

Patented July 12, 1938

2,123,385

UNITED STATES PATENT OFFICE 2,123,385

MOUNTING FOR OPHTHALMIC LENSES

Joseph W. Smith, Cambridge, Ohio, assignor to Bausch & Lomb Optical Company, Rochester, N. Y., a corporation of New York Application November 16, 1933, Serial No. 698,324

5 Claims. (Cl. 88—47)

My invention relates to mountings for ophthalmic lenses. More specifically, it relates to spectacles and particularly that type known as rimless spectacles. However, there are certain features of my invention not necessarily limited thereto.

In the past few years, rimless spectacles have become very popular. However, even though the use of rimless spectacles has increased greatly, there are still certain undesirable features inherent in them. In all rimless spectacles, it is usual to fasten the temples directly to the lenses and this is done mainly by drilling holes through the temporal ends of the lenses and passing screws or rivets therethrough. The inner ends of the lenses are attached to the bridge member in a similar manner. Thus, the lenses are rigidly attached at one end to the bridge member and at their other end they are also rigidly attached to the temples of the spectacles. Obviously, this rigidity at the points of attachment frequently subjected the lenses to a considerable strain, as for instance, when they are hurriedly "put on" or "taken off". Many times this strain is serious enough to either cause the lenses to break at the edges where they are connected to the temples or at the edges connected to the bridge member, and in some cases, the strain is even sufficient to cause the entire lens to break in two. Also, due to this rigid mounting of the lenses, sudden shocks or jars upon the temple pieces, even when the spectacles are in position on the wearer, exerts a strain upon the lenses and often causes breakage thereof. Thus, with prior art rimless spectacles this danger is usually present.

Another disadvantage of prior art spectacles, due to the rigidity of the mountings, is that they must generally be adjusted tightly to hold them from slipping on the nose. Consequently, the glasses will not feel very comfortable. The only resiliency in many prior art spectacles is in the extreme ends of the temples which fit around the ears and this is not very great. Consequently, when fitting the spectacles, it is necessary to fit the wearer in such a manner that a fairly strong pull is continuously exerted by the temples in order to keep the spectacles in position on the nose. This causes a pressure both on the nose and on the ears which is not pleasing to the wearer and also may hurt the wearer. Thus, obtaining a tight fit will result in discomfort to the wearer of the spectacles, but if a tight fit is not obtained, the glasses will slip down on the nose.

Still another disadvantage of prior art spectacles has resided in the fact that they have not been readily adjustable to fit the needs of the individual wearer. It is well known that in most instances it is desirable to adjust the lenses relative to the mountings in order to suit the needs of the individual. Also, it is desirable to adjust the guard members of the spectacle in order that they properly fit the nose of the wearer and to adjust other parts of the mountings. In prior art spectacles, these adjustments have been accomplished only with considerable difficulty.

One of the objects of my invention is to provide a mounting for ophthalmic lenses which is very simple in structure and which can be manufactured at a low cost.

Another object of my invention is to provide a mounting for ophthalmic lenses which is very pleasing in appearance.

Another object of my invention is to provide a mounting for ophthalmic lenses which is of such a type that the lenses will be free from strain at all times and consequently there will be practically no danger of breakage thereof.

Another object of my invention is to provide a mounting for ophthalmic lenses which is of such a type that it may be easily and quickly adjusted in a large variety of ways, in order to suit the needs of the individual wearer.

In its preferred form, my invention contemplates the provision of rimless spectacles, in which the temples are not connected to the temporal ends of the lenses but pass from said ends over the upper edges of the lenses to which the inner ends thereof are attached. Thus, it is not necessary to drill holes in the temporal ends of the lenses in order to attach the temples thereto, but instead, the temples are connected directly to the bridge member.

Due to the fact that the temples are connected to the bridge member and extend laterally therefrom across the upper edges of the lenses before passing back to the ears, there will be a great amount of resiliency possessed by these temples and, consequently, the lenses will not be subjected to strain at any time. Also, due to the fact that the lenses are attached only to the bridge of the mounting, they are subjected to no strain whatever from the pull of the temples. My invention also contemplates the connecting of the bridge member to the lenses at points close to the upper edges of the pair of lenses. Thus, comparatively long guard arms can be provided for supporting the spectacles at a proper height. Since these guard arms will be comparatively long, and also due to the particular structure thereof, they may be readily adjusted in any direction in order that the guards properly fit on the nose of the wearer. Also, due to the type of temples which I use and to the manner in which they are connected to the lenses, the mountings may be adjusted in a great variety of ways to suit the needs of the wearer.

The preferred embodiment of my invention is shown in the accompanying drawing wherein similar characters of reference designate corresponding parts and wherein.

Figure 1:
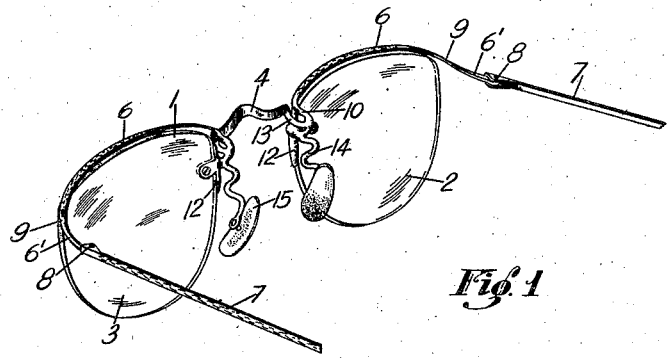
Figure 1 is a perspective view of a pair of rimless spectacles made in accordance with the principles of my invention.

In the drawing, I have illustrated a pair of rimless spectacles 1 embodying the principles of my invention. These rimless spectacles 1 comprise a pair of lenses 2 and 3 which are joined together by a bridge member 4. This bridge member may be of any desired shape and material. The manner in which this bridge member is connected to the lenses will be described more in detail hereinafter.

Instead of connecting the temple members to the temporal ends of the lenses, I connect these members directly to the bridge member of the spectacles. Thus, in the drawing, I show the temple members 5 having their inner ends connected to the bridge member, then passing outwardly over the upper edges of the lenses, and then rearwardly in the usual manner. Throughout this specification, when I refer to temple members, I mean the members 5 which extend from the bridge member, over the lenses, and then rearwardly to the desired extent.

Each of the temple members comprises a portion 6 which has its inner end connected to the bridge member 4 and which extends outwardly over the upper edge of the lens to the temporal side thereof, and the rearwardly extending straight portion 7 which may terminate in any of the usual ways. The portions 6 and 7 of each of the temple members are hingedly connected as at 8.

Figure 3:
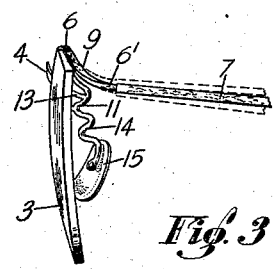
Figure 3 is a side elevation of the spectacles shown in Figure 1 and illustrating by the dotted lines how the temple members will automatically adjust themselves in a vertical plane when necessary.
Figure 2:
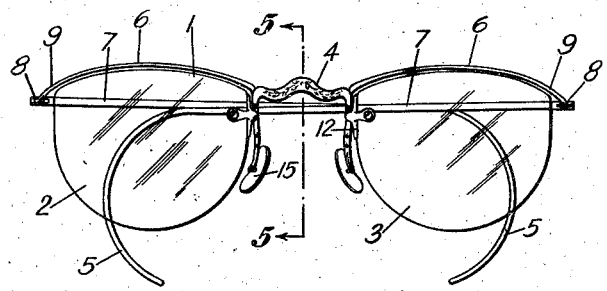
Figure 2 is a plan view of the spectacles shown in Figure 1, the temples being folded over into an inoperative position.

The portion 6 of each of the temporal members may be made of any suitable resilient material. It preferably is flat and comparatively thin. It preferably conforms to the upper edge of the lens and is spaced slightly therefrom so that it may move back and forth without interference therewith. It will be readily apparent from the drawing that due to the fact that this portion 6 is thin and is curved in such a manner that it corresponds to the contour of the upper edge of the lens, it will be quite inconspicuous. The extreme outer end of each of the portions 6 preferably curves downwardly and rearwardly as indicated at 9 when it reaches the temporal end of the lens. This curved portion 9 is preferably curved to such an extent as to fit the rounded form of the average face. By curving the end of the member 6 in this manner a rearwardly extending portion 6' is produced (Figure 3). This portion 6' is hingedly connected to the straight portion 7 of the temple member as previously described.

The hinge structure 8 can be made very light and delicate inasmuch as it will never be subjected to any great stress due to the resiliency of the temple members, as will appear later. The female portion of the hinge is preferably made on the outer end of the portion 7 of the temple inasmuch as this portion can be made heavier than the rearwardly extending portion 6' of member 6. By providing this hinge structure, the straight portion 7 of the temple member may be swung laterally in the usual manner.

Figure 5:
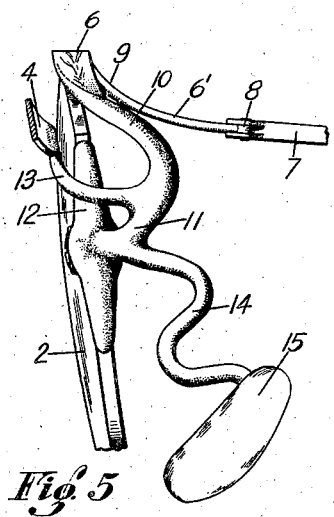
Figure 5 is a section taken substantially on line 5—5 of Figure 2 but being greatly enlarged for clearness.

I will now describe specifically the manner in which the inner ends of the portions 6 are connected to the bridge member 4 and the manner in which the lenses are connected thereto. With reference to Figure 5 in particular, it will be seen that the portion 6 passes inwardly and downwardly over the upper edge of the lens until the inner end thereof is reached. The portion 6 is then curved rearwardly as indicated at 10 and then forwardly as indicated at 11 to produce, substantially, a semicircle. The outer extremity of the portion 11 is substantially in line in a vertical plane with the transversely extending portion 6. To this outer extremity is connected a lens strap 12 of the usual type which is used for attaching the lens to the mounting.

Between the legs 10 and 11 of the semicircular portion, is an outwardly extending arm member 13 whose outer end is connected to the end of the bridge member 4. It will be apparent that the connections at each end of the bridge member are identical. The lens straps 12 are connected to the lenses close to the upper edges thereof.

The mounting is connected to the lenses at a high point so that I can provide guard arms 14 which are comparatively long and which are substantially M-shaped. The upper ends of these guard arms are connected to the portions 11 of the semicircular portions previously mentioned. The lower ends of the arms 14 have suitable guards 15 universally mounted thereon.

Figure 4:
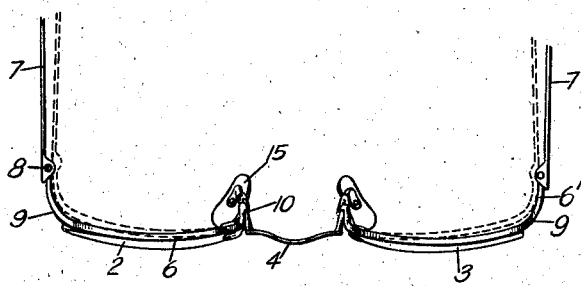
Figure 4 is a view looking down on the upper edges of the spectacles and showing by dotted lines how the transversely extending portions of the temples will bend rearwardly when necessary.

Due to the fact that the members 6 are comparatively long and are connected only to the bridge member at their inner ends, and also due to the resiliency of the material thereof, these members serve as long lever arms which will "give" back and forth as illustrated in Figure 4. Since the portions 6 conform to the contour of the upper edges of the lenses and since they are spaced slightly therefrom, there will be no interference between these portions and the lenses when said portions swing back and forth. Thus, the mounting which I have provided will have a great amount of resiliency and any sudden shocks or jars or pulls on the temple pieces will be absorbed to a considerable extent. Any shocks or strains not absorbed will be transmitted to the bridge member and will have no detrimental effect on the lenses.

It will also be apparent from Figure 3 that the temple members will automatically adjust themselves up and down when necessary. This is due to the fact that the portions 6 are long and flat and are composed of resilient material. Therefore, the portions 7 of the temples can swing up and down, as illustrated by the dotted lines, and this up and down swinging will merely cause twisting of the portions 6.

With these mountings which I have provided, there can be no strain on the lenses as they are attached to the bridge member only. It is therefore unnecessary to provide unsightly holes at the temporal ends of the lenses as required by the prior art methods. Furthermore, the lens surfaces at the temporal edges are not encumbered by lens straps and temple connections which interfere with vision sideways. In the prior art, breakage of lenses most frequently occurs in "putting on" the glasses or removing them, because the wearer necessarily handles them by the temples which puts a strain on the lenses and causes them to snap away from the holding "straps". This of course can not occur in my structure because the lenses are not attached to the temples.

When prior art spectacles are worn, there is a constant tension existing between the ear and nose in the attempt to prevent the spectacles from slipping downwardly. To obtain the proper amount of this tension is a matter of such delicate and skilful adjustment that discomfort and distress to the wearer is a frequent result. With my mounting, however, there is such great resiliency in the entire temple that sufficient tension to hold the lenses in position is obtained without causing excessive strain either on the nose or ears.

Another very important feature of my invention resides in the fact that these spectacles may be more readily adjusted to suit the needs of the individual wearer. For example, the rearwardly extending portions 6' of the portions 6 may be bent upwardly, downwardly or to either side so that the portions 7 of the temples will extend in the proper directions to suit the wearer. The semicircular bends at the points of connection of the bridge member are calculated to enable the practitioner to angle the lenses "under" as in the case of reading glasses, or in cases where the ears may be exceedingly low. The lenses may also be angled "backwardly", if desired. In fact, the lenses may be adjusted relative to the mountings in any desired manner. The semicircular portions formed by 10 and 11 at the inner ends of members 6 also enable the optician to raise or lower the members 6 of the temples so that they will fit closely and inconspicuously near to the tops of the lenses. Also, the arms 13 of the attachment of the bridge may be adjusted in such a manner as to move the bridge forward or backward, without molesting the lenses, in order to compensate for various sizes of noses.

As previously stated, the guard arms 14 are comparatively long and will hold the lenses up at a sufficient height before the eyes. Due to the fact that these guard arms are comparatively long and are of substantially M shape as shown, they may be adjusted in any number of ways in order to suit the wearer. For example, they may be readily swung laterally to either side desired in order to position the guards 15 in any desired lateral positions. They also may be swung backwardly or forwardly as desired. Furthermore, they may be stretched apart in order to increase their length, or compressed in order to shorten them. Obviously, any number of desired adjustments can be obtained with these arms due to the length thereof and the form thereof. Of course, the arms could assume other shapes without departing from the scope of my invention.

It will be seen from the above description that I have provided a mounting for ophthalmic lenses having many desirable features not possessed by prior art mountings. Other advantages than those pointed out will be apparent from the specification, drawing and claims appended hereto.

Having thus described my invention, what I claim is:

1. A pair of spectacles comprising a pair of lenses, a rimless mounting for said lenses, said mounting comprising a pair of temple members, each of said temple members comprising a laterally extending portion which extends over the upper edge of the lens and conforms substantially to the contour thereof, said laterally extending portion being spaced slightly above the upper edge of the lens and normally lying in substantially the same vertical plane as the lens, said laterally extending portion being resilient and movable back and forth relative to the lens, the said laterally extending portion extending past the outer edge of the lens and then being turned downwardly and rearwardly, a rearwardly extending temple portion having its forward end pivotally connected to the outer end of said laterally extending portion, a bridge member for connecting the inner ends of the laterally extending portions of the temple members together, the ends of the temple members being connected to the bridge member by semicircular portions which facilitate adjustment, a single point attachment for attaching each of said lenses to said mounting, each of the lenses being attached to the mounting at a point located adjacent the top and inner edges thereof, downwardly extending guard carrying arms having guards on the lower ends thereof, said guard carrying arms being comparatively long and substantially M-shaped so that they may be readily adjusted.

2. A pair of spectacles comprising a pair of lenses, a rimless mounting for said lenses, said mounting comprising a pair of temple members, each of said temple members comprising a laterally extending portion which extends over the upper edge of the lens and conforms substantially to the contour thereof, said laterally extending portion being spaced slightly above the upper edge of the lens and normally lying in substantially the same vertical plane as the lens, said laterally extending portion being resilient and movable back and forth relative to the lens, the said laterally extending portion extending past the outer edge of the lens and then being turned downwardly and rearwardly, a rearwardly extending temple portion having its forward end pivotally connected to the outer end of said laterally extending portion, means for connecting the inner ends of the laterally extending portions of the temple members together, a single point attachment for attaching each of said lenses to said mounting, each of the lenses being attached to the mounting at a point located adjacent the top and inner edges thereof, downwardly extending guard carrying arms having guards on the lower ends thereof, said guard carrying arms being comparatively long so that they may be readily adjusted.

3. In an ophthalmic mounting, the combination of a bridge, a lens holding device, means connecting the bridge and lens holding device, said device having a part engaging the nasal edge of a lens secured to said device, a portion constituting a part of the means for connecting said bridge to the lens holding device, said portion being connected to and extending rearwardly from the lens-edge-engaging part of said device, a member extending from a point on said portion which is spaced rearwardly from the lens, said member extending upwardly and forwardly from said portion so as to provide means for facilitating adjustment of said member, and thence extending along and close to the upper edge of the lens and in its plane and terminating at a point adjacent the temporal edge of the lens, said member being secured only to said portion and having its outer end free, and a temple pivotally mounted on the free end of said member.

4. An ophthalmic mounting comprising a pair of lenses, a pair of lens holding devices attached to the respective nasal edges of said lenses, each of said devices having a part engaging the edge of the lens and parts engaging the respective front and rear faces of the lens, a bridge, means for connecting the respective ends of said bridge to the lens-edge-engaging part of each device and means extending rearwardly from said first-named means and thence upwardly and outwardly closely adjacent to the lens and following the contour of the upper edge of the lens without attachment thereto and terminating in a free end which extends rearwardly and downwardly near the temporal edge of the lens, a temple pivotally secured to said end, an arm secured to said first-named means and extending rearwardly therefrom and a nose-engaging pad carried by said arm.

5. In an ophthalmic mounting, the combination of a lens, a lens holding device secured to the nasal edge of the lens and above the horizontal axis thereof, said device having a lens-edge-engaging part, a portion secured directly to said part and extending rearwardly therefrom, a member extending upwardly from a point on said portion which is spaced rearwardly from the lens and thence extending outwardly closely adjacent to the lens and following the contour of the upper edge of the lens without attachment thereto and terminating in a free end which extends downwardly and rearwardly adjacent the temporal edge of the lens, a temple pivotally mounted on said free end, a rearwardly extending arm secured to said portion and a nose-engaging pad carried by said arm.

JOSEPH W. SMITH.